Oct. 15, 1940.   M. E. FONKEN   2,217,896
APPARATUS FOR MAKING CINNAMON ROLLS AND THE LIKE
Filed Nov. 10, 1939   4 Sheets-Sheet 1
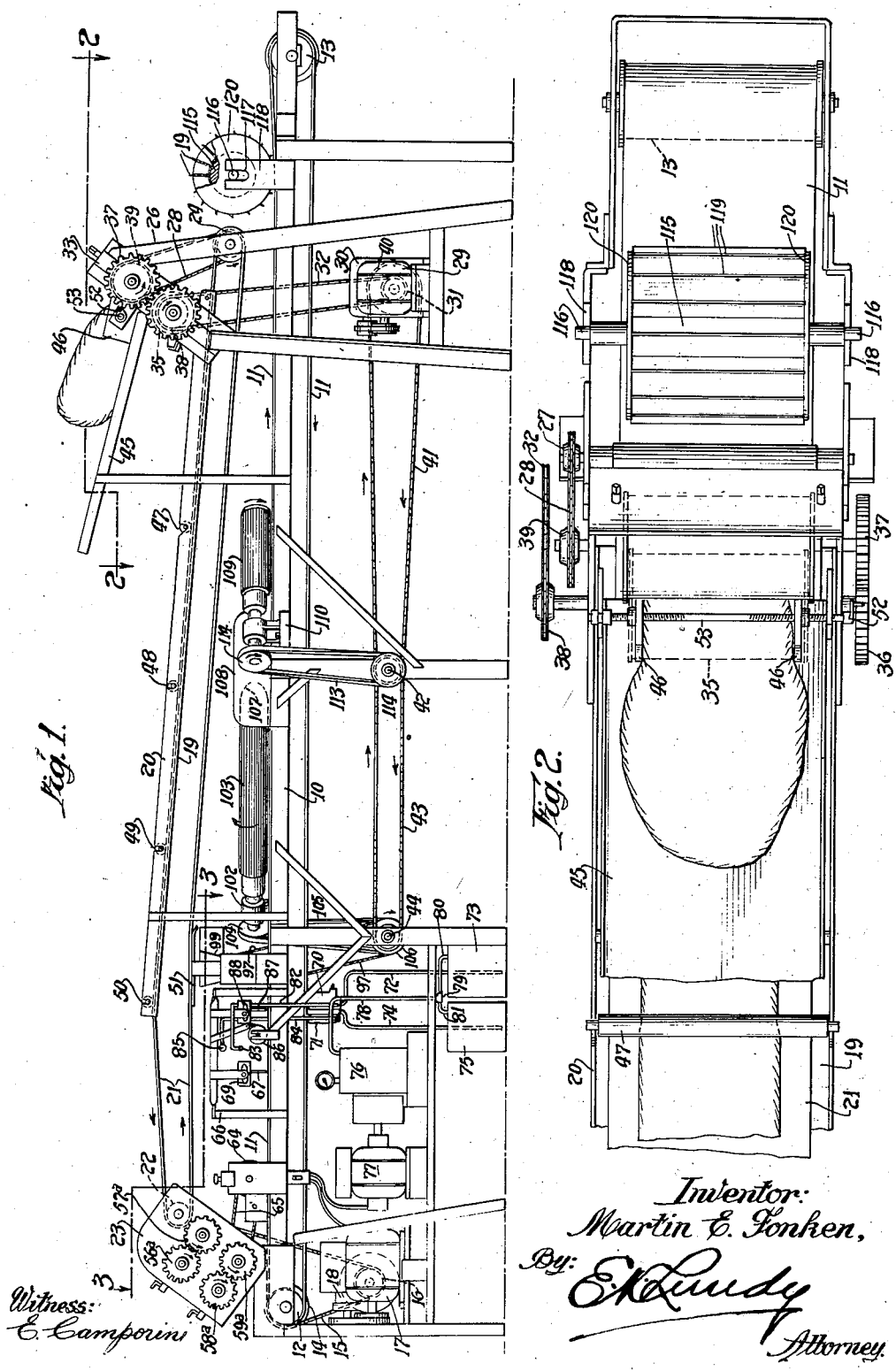
Inventor:
Martin E. Fonken,
By E. K. Lundy
Attorney
Witness:
E. Camporini

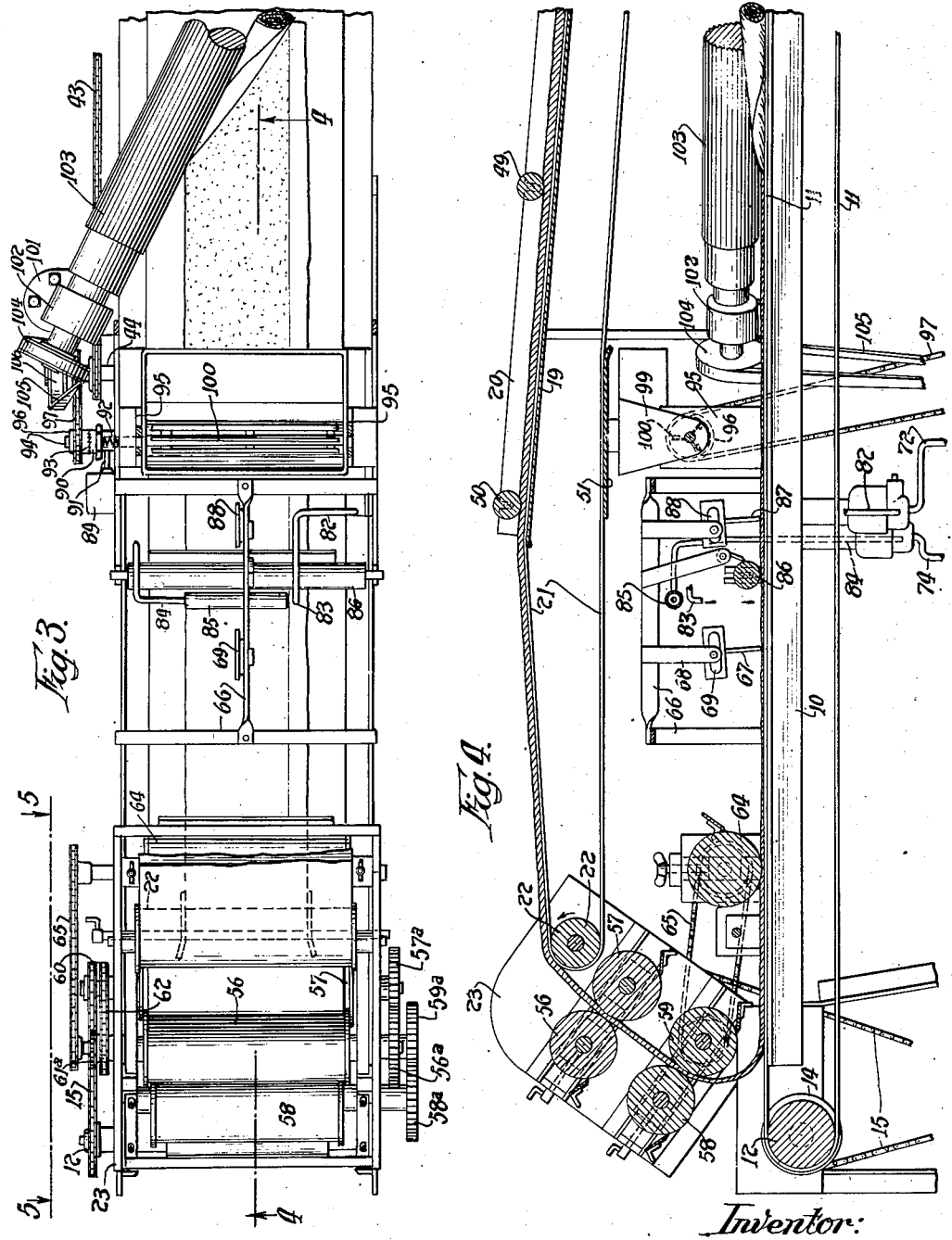

Oct. 15, 1940.                M. E. FONKEN                2,217,896
             APPARATUS FOR MAKING CINNAMON ROLLS AND THE LIKE
                   Filed Nov. 10, 1939          4 Sheets-Sheet 3

Witness:
E. Campouni

Inventor:
Martin E. Fonken,
By: E. R. Lundy
Attorney.

Oct. 15, 1940.    M. E. FONKEN    2,217,896
APPARATUS FOR MAKING CINNAMON ROLLS AND THE LIKE
Filed Nov. 10, 1939    4 Sheets-Sheet 4
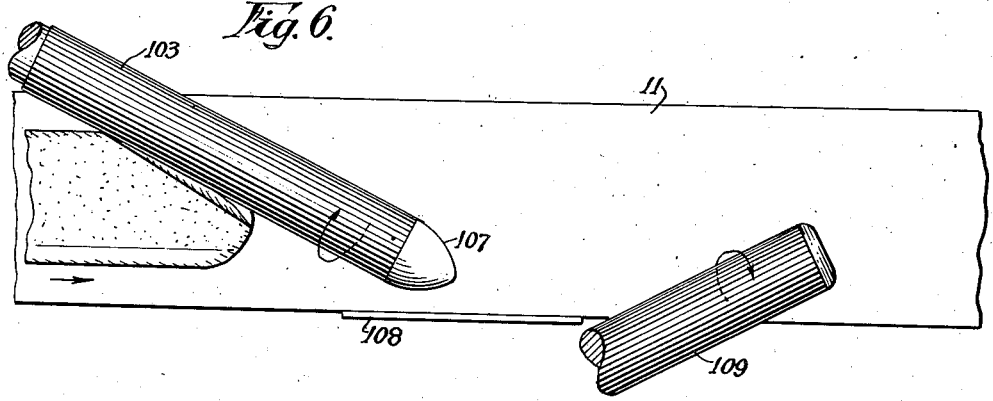
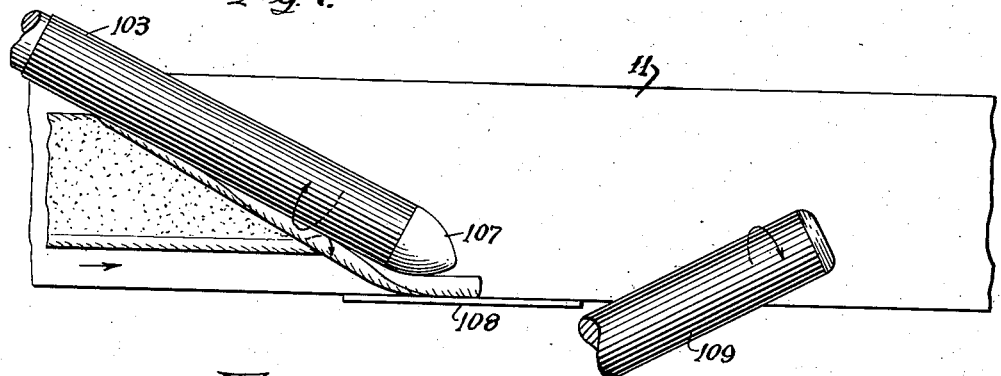
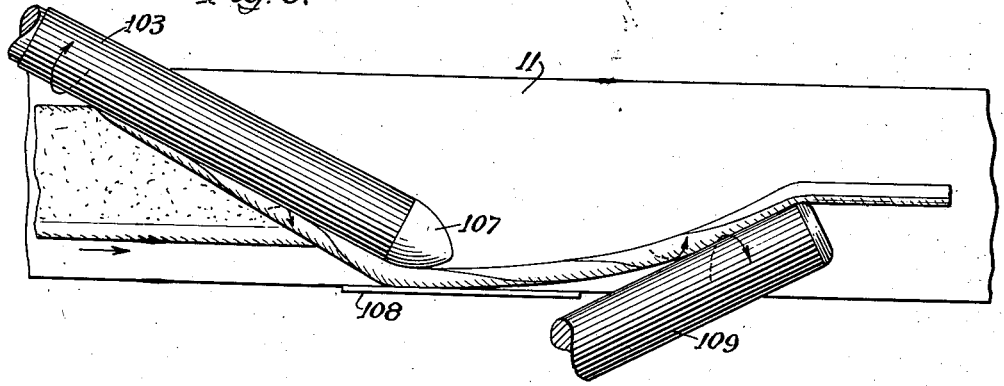
Inventor:
Martin E. Fonken,
By: [signature]
Attorney.
Witness:
E. Camporini Patented Oct. 15, 1940

2,217,896

UNITED STATES PATENT OFFICE 2,217,896

APPARATUS FOR MAKING CINNAMON ROLLS AND THE LIKE

Martin E. Fonken, Beloit, Wis., assignor to Fish Oven & Equipment Company, Beloit, Wis., a corporation of Wisconsin Application November 10, 1939, Serial No. 303,844

19 Claims. (Cl. 107—9)

REISSUED

DEC 7 1943

This invention relates to apparatus for handling dough. Specifically, this apparatus is designed for the purpose of treating the dough and rolling the treated sheet into a spiral form for cinnamon rolls before they are placed in the oven for baking.

The apparatus is adapted to receive a large mass of dough and squeeze it between the shaping members which reduce its thickness and gauge its width, and then pass the flattened dough strip to a conveyor moving over the solid table where the flat strip is again treated with pressure members that further compress it and assist in sealing the gases within the flattened mass. At the end of the conveyor the dough strip is transferred by the pressure rollers to a lower conveyor where one margin surface of the dough strip receives a coating of water or the like while the remaining or major portion of the width of the strip is coated with a suitable oily substance. Sugar and cinnamon, or other flavoring is next sprinkled upon the oiled surface during the travel of the dough on the lower conveyor. After receiving this treatment the dough strip is operated on by a spiraling cylinder disposed oblique to the line of travel of the conveyor which roller coils the strip in an oblique manner and allows it to pass beyond the end of the cylinder at one margin of the conveyor. When leaving this cylinder the water coated margin of the coiled dough is outermost with its edge disposed helically around the rolled strip. It is desirable however to straighten out this outer edge of the dough so that it is parallel to the length of the rolled piece. This is accomplished by operating on the rolled mass with the second cylinder that is oblique to the line of travel of the dough and extends over the margin of the conveyor opposite the first named cylinder. This operation straightens the long mass of dough so that the edge of the water-coated margin is disposed in a substantially straight line longitudinally of the mass. A suitable cutter wheel next engages the dough and severs it into small pieces ready to be placed in the pans or trays in which the cinnamon rolls are baked.

The operation of this apparatus is entirely automatic and suitable controls are provided for discharging the water and oil coating materials at the proper time, as well as controlling the discharge of the sugar and flavoring after the coating has been performed. The operation of the apparatus is rapid and the rolls which leave the lower conveyor are all of the uniform size. During transit of the dough through the apparatus it is not necessary for the attendant to handle the dough until the small pieces leave the discharge end of the apparatus.

It is an object of this invention to provide a novel dough handling apparatus for making spirally formed rolls. The apparatus is novel in the arrangement of its component parts, it is effective and dependable in performing its various functions.

Other objects are to provide a roll forming apparatus that is made of simple and sturdy parts that will not readily get out of order, and which is economical to manufacture so that it may be cheaply produced and sold to the user for a reasonable retail price.

Further objects and advantages of the present invention will be apparent to persons skilled in the art after the nature of the apparatus is understood from the following disclosure. The apparatus embodies the novel construction, combination, and arrangement of parts substantially as herein described and as illustrated in the accompanying drawings, and finally, as pointed in the claims.

The invention is herein shown in a particular or typical embodiment, but this is not to be taken in any manner as the limiting the scope of the claims thereto.

In the drawings—

Figure 1 is a longitudinal side elevation of the apparatus contemplated herein.

Figure 2 is a top plan of the right hand end portion of the structure in Figure 1, drawn to a larger scale on the plane of line 2—2 of Fig. 1.

Figure 3 is a plan on the plane of line 3—3 at the left end portion of Fig. 1 and drawn to the same scale as Fig. 2.

Figure 4 is a vertical longitudinal section on line 4—4 of Figure 3, looking in the direction of the arrows.

Figure 6 is a diagram of the shaping members showing the first shaping operation or coiling of the dough strip obliquely across the conveyor apron.

Figure 7 is a diagram, similar to Figure 6, showing the second shaping operation wherein the coiled dough leaves the coiling roller.

Figure 8 is a diagram, similar to Figure 6, showing the third shaping operation wherein the direction of movement of the coiled dough is changed by engagement with a second roller, during which operation the helically disposed outer layer of the coil is straightened.

The drawings are more or less schematic, and in the different views the same reference characters are used to identify like parts wherever they appear.

Figure 5:
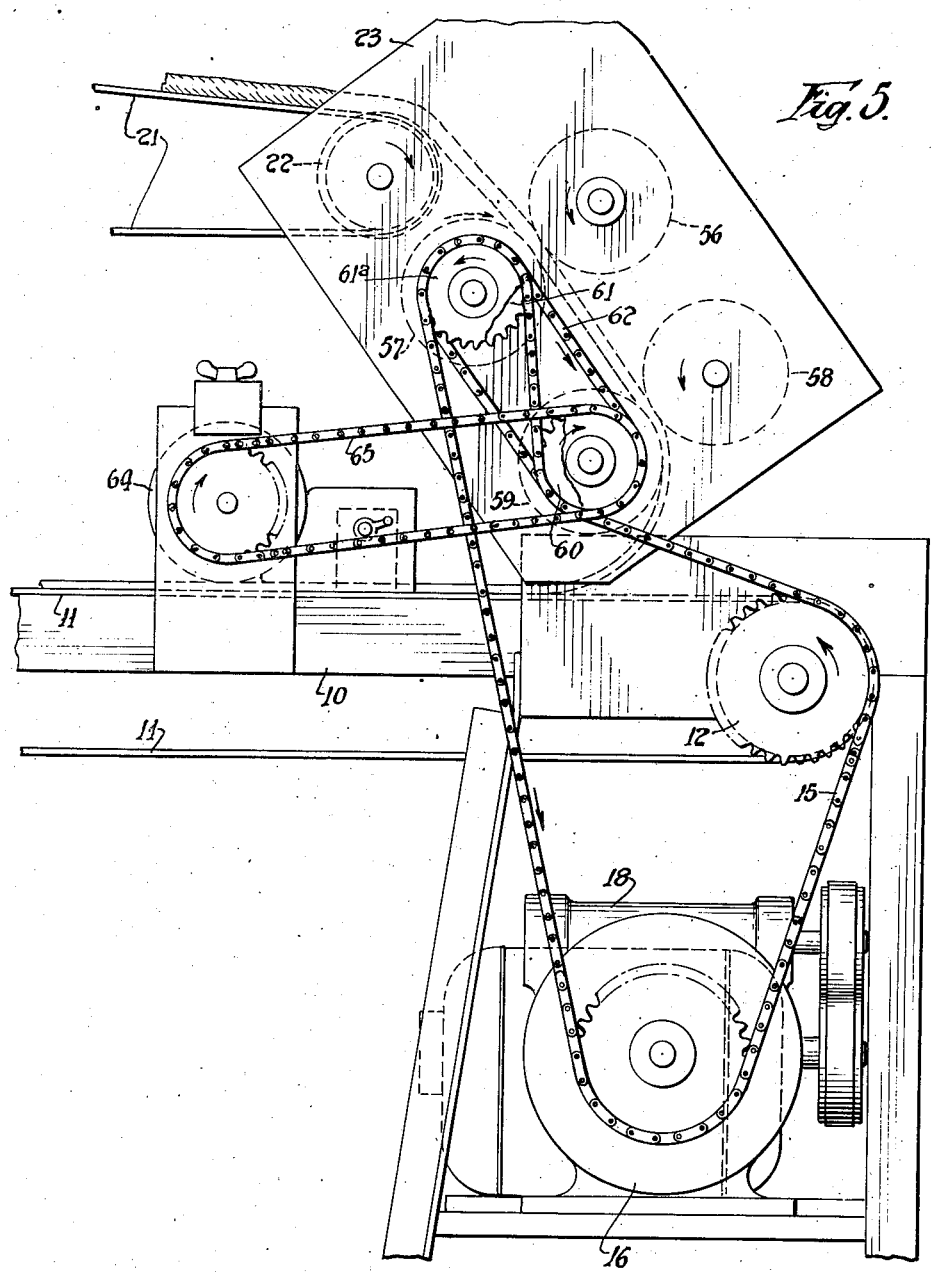
Figure 5 is a vertical elevation of the left hand end portion of Figure 3 and looking at the same on the plane of line 5—5, and drawn to a larger scale.

As illustrated in Fig. 1 this apparatus embodies an elongate supporting structure which comprises a flat table 10 preferably a metal sheet having down-turned longitudinal edges to which a plurality of supporting legs are attached to dispose the table at the desired working height from the floor. This table 10 is traversed from left to right by an endless conveyor 11 which passes around the drive pulley 12 at the left end of the table and around the free pulley 13 at the right end, and the return portion of the apron conveyor 11 moves below the table. The pulley 12 has a sprocket 14 secured to one end of its shaft, which sprocket is engaged by an endless chain 15 that is actuated by a drive sprocket 16. An electric motor 17 is mounted on a shelf below the table and its shaft is suitably connected to a speed reducer 18, the slow shaft of which projects beyond the housing of the speed reducer and has the drive sprocket 16 secured to it. The chain 15 after leaving the sprocket 14 moves upwardly to actuate other parts of the apparatus to be later described, and then back to sprocket 16.

Suitably supported above the table 10 there is a platform 19 that is preferably a metal sheet having up-turned longitudinal flanges 20 and an endless conveyor apron 21 traverses this platform in a direction from right to left. After leaving the left end of the platform the conveyor apron 21 passes around an idle pulley 22 that has its shaft journaled in side plates 23 extending above the table. Beyond the right end of the platform 19 the apron passes around the driven pulley 24 that has its shaft journaled in uprights 26, and a sprocket 27 is secured to an end of the pulley shaft and is driven by a chain 28. Below the right end of the table there is an electric motor 29 that is connected with a suitable speed reducer 30 and the latter has its slow shaft projected beyond its casing where it has a small sprocket 31 secured to it to drive the chain 32.

A suitable supporting frame 33 is connected at its ends to the uprights 26 and carries suitable journaling blocks for the shafts of upper and lower pressure rollers 34 and 35 respectively. The shaft of roller 35 projects beyond its bearings and at one end is provided with a gear 36 that meshes with a gear 37 on the adjacent extended end of the shaft of roller 34. The other end of the shaft of roller 35 is provided with a sprocket 38 with which the drive chain 32 engages. A similar sprocket 39 is secured to the other end of the shaft of roller 34, which sprocket 39 is engaged by the chain 28. Movement of the drive chain 32 rotates the lower roller 35 in the direction of the arrow and a gear 36 connected with its shaft actuates the upper gear 39, which in turn rotates its roller 34 together with its sprocket 39, and it also drives the conveyor apron 21 through the medium of the chain 28 and sprocket 27 on the shaft of conveyor pulley 24.

A large sprocket 40 is secured to the speed reducer alongside the small sprocket 31 and a chain 41 engaged with said sprocket extends longitudinally to the mid-portion of the apparatus where it drives a horizontal shaft 42 through the medium of a sprocket connected to said shaft. A second sprocket on this shaft 42 is engaged by a driven chain 43 that extends to and drives a sprocket on a second horizontal shaft 44 to the left of the first named shaft 42. These elements are adapted to actuate certain portions of the apparatus which will later be described.

There is a chute 45 above the platform 19, which chute is adapted to receive the dough batch and which is inclined downwardly to feed the dough toward the pressure rollers 34 and 35 so that the dough is discharged from the chute into a space between these rollers where it is compressed into a flat strip. Marginal guide plates 46 are mounted for adjustment toward and from each other adjacent the discharge end of the chute 45 and are adapted to guide the dough and limit the width of the flattened strip passing between the pressure rollers 34 and 35. After leaving the rollers the strip of dough passes to the conveyor apron 21 by which it is conveyed from the right end to the left end of the apparatus. During its transit along the platform 19 the dough strip passes successively under the series of rollers 47, 48, 49, 50, which are adapted to further compress the dough and condition it for a final compression which takes place at the left end of the apparatus. The return run of the conveyor apron 21 after leaving the pulley 22 passes over a guide plate 51 which holds the conveyor taut and also raises the return run of the conveyor to a plane slightly below the platform 19 so that it will clear the mechanism which is mounted upon and operates on the table 10. The rollers 47 to 50 are of solid metal in order to increase their weight and their trunnions are mounted in vertically disposed slots in the side flanges 20 of the platform 19 which permits the rollers to be freely raised or lowered with respect to the platform. The bottoms of the slots, when the dough is passing under the rollers, are below the trunnions so that the weight of each roller is exerted against the surface of the dough strip and assists in conditioning the dough while reducing the thickness of the strip. The width of the strip of dough passing into and between the pressure rollers 34 and 35 at right end of the apparatus is readily controlled by turning a small crank 52 on the end of a shaft 53 that has right and left threads on its end portions. This shaft is journaled on the chute 45 and the guide plates 47 have suitable bosses that are bored and tapped to be engaged by the threaded portions of the shaft 53.

The spaced frames 23 are provided with means for adjustably journaling the trunnions or shafts of two pairs of pressure rollers 56—57 and 58—59 that are disposed so that the strip of dough leaving the conveyor apron 21 will be received between the upper pair of rollers 56—57 and be discharged therefrom in an oblique direction downwardly to the lower pair of pressure rollers 58—59. By means of this set of rollers the dough is transferred from the upper conveyor apron 21 to the lower conveyor apron 11 in a continuous manner. The ends of the trunnions or shafts of the upper pair of rollers 56—57 have gears 56a and 57a respectively secured to them which gears are in mesh with each other so that these rollers rotate simultaneously in opposite directions relative to each other. Similarly, the shafts or trunnions of the lower pair of rollers 58—59 extend beyond their bearings and have gears 58a and 59a respectively secured to them, which gears are in mesh with each other so that said rollers are simultaneously actuated in the opposite directions. The end of the trunnion or shaft of roller 59, opposite the end thereof which carries the gear 59a, has a sprocket 60 secured to it that is engaged by the chain 15 which derives its motion from the motor 17. The trunnion or shaft of roller 57 opposite the gear 57a is provided with a sprocket 61 that is connected, by means of a chain 62 with a sprocket 63 alongside the sprocket 60 whereby the rotative movement of the latter sprocket is transmitted to the upper pair of rollers 56—57 and cause the latter rollers to be rotated in the same directions as the respective rollers 58—59.

The dough strip, after being transferred through the medium of the two pairs of rollers as above described, is disposed upon the adjacent portion of the conveyor apron 11 and begins its reverse movement from left to right. A short distance from the transfer rollers the dough is engaged by a pressure roller 64 which derives its motion from the chain 65 and sprockets that are connected to said roller and to the roller 59.

A suitable bridge-frame 66 is mounted upon the table and spans the apron 11. The swinging trigger finger 67 is pivotally supported by the bridge frame in a pendant manner from a hanger 68 so that the lower end of this finger is directly in the path of the moving strip of dough which as shown in Fig. 1, is approaching this trigger. When the moving strip contacts the trigger 67 the latter will swing to operate a mercury-switch 69 which is suitably connected by electric conductors to a pair of magnetic valves 70—71 suspended below the table.

The above-mentioned valves control the flow or discharge of suitable fluids that are to be coated upon the strip of dough. The magnetic valve 70 controls the feed pipe 72 leading from a water receptacle 73, and the magnetic valve 71 controls the feed pipe 74 leading from a receptacle 75 containing a suitable oily liquid. These receptacles or containers 73 and 75 are air tight and a constant pressure is maintained therein by means of a suitable air compressor 76 that is driven by a motor 77. The compressor is connected to the interiors of the receptacles by a pipe 78 having T-coupling 79 from which branch pipes 80 and 81 lead into the respective containers. The discharge side of valve 70 communicates with a pipe 82 leading up to a plane above the apron where it extends inwardly under the bridge frame and its discharge end 83 is so located that the water is permitted to drip upon one margin of the dough passing under the same. The magnetic valve 71 has a discharge pipe 84 leading upwardly to about the plane of the water or pipe 82 where it is provided with a discharge tube 85 that is perforated through its lower segment to permit the oily liquid to be discharged upon the remaining surface of the dough strip to the edge opposite the margin which is water treated.

After receiving these coatings of oil and water, the dough strip passes beneath a spreading roller 86 that rests upon the top surface of the dough strip and distributes the liquids evenly across the respective proportions of the face of the strip.

After passing the spreading roller 86, the leading edge of the dough strip is adapted to engage a second trigger 87 which, when actuated is adapted to operate a mercury switch 88 and close the circuit to an electric appliance 89 mounted upon the side of the table. This electric appliance may be in the form of a damper motor, a solenoid or other automatic device. Its function is to operate the movable member or sleeve 90 of the toothed clutch that is connected with the appliance 89 by a rod or shaft 91. A spring 92 exerts its tension to shift the movable clutch member 90 out of its coacting member 93 when the switch is operated to open the circuit to the electric appliance 89. The clutch members 90 and 93 are supported upon the outer end of a shaft 94 that is journaled in suitable bracket members 95 extending above the table a suitable distance. The shaft 94 has a sprocket 96 on its end nearest the clutch that is driven by a chain 97 deriving its movement from a sprocket 98 on the adjacent end of the shaft 44 above mentioned.

A suitable container 99 is mounted on the bracket members 95 for receiving a quantity of sugar and cinnamon or other flavoring, and shaft 94 passes through this container and has suitable agitating blades 100 on it which are rotated in the body of the sugar and flavoring. The lower portion of the container 99 is curved to accommodate the moving paddles and said lower portion is perforated in the manner of a sieve so that when the paddles are rotated the sugar and cinnamon will be discharged upon the dough strip which has been treated with the oily liquid and does not provide a coating upon the margin of the dough which has been coated with water.

After the dough has been treated and coated as herein before described, it is engaged by a suitable roller that operates upon it to coil the dough in an oblique spiral with the water coated margin outermost and disposed in a helical manner upon the exterior of the coil of dough. The elongated rolled mass is then straightened by engagement with another roller so that the helical outer edge of the watered margin is then disposed longitudinally in a substantially straight line on the outside of the coil.

In order to operate on the flat strip to coil it spirally and then straighten the helical margin of the roll, suitable novel devices are provided between the container 99 and the discharge end of the conveyor 11. A turret bracket 101 is secured to the side of the table 10 near the location of the clutch. This turret has a suitable upright standard and upon the top of the standard there is a hollow embossment 102 to receive the spindle or trunnion of a corrugated roller 103. The trunnion of the roller is shouldered at the embossment to guide it and said trunnion projects through the embossment where it has a sheave 104 secured to it that is driven by a belt 105 deriving movement from a sheave 106 on the outer end of the shaft 44 which is journaled in the table leg or support immediately below the sheave 104. As seen in Fig. 3 and in the diagrams Figs. 6, 7, and 8 the axis of the corrugated roller 103 is oblique to the line of travel of the apron and said roller extends across the table close to the top surface of the apron and terminates at its free end in an acorn-shaped end 107 near the opposite side of the table. There is an upright shield or deflector 108 secured to the side of the table which is nearest the tapered end of the roller 103 to maintain the roll of dough on the conveyor apron. This roller is driven in a direction opposing the direction of travel of the dough strip on the apron 11 and it is thereby adapted to roll the dough strip obliquely while the latter is moving along with the apron. This action forms a coiled elongate mass which leaves the roller at the tapered end approximately in contact with the shield or deflector 108 along which the roll will travel a short distance longitudinally with the apron close to the margin thereof. This coiled mass of dough has the sugared and flavored portion innermost of the coil, while the margin which has been coated with the water is the outermost layer and this layer is disposed in a helical manner around the roll of dough.

It is desirable to straighten the above described helical layer so that it will be longitudinally disposed in an approximately straight line along the roll of dough before the roll is cut into the small pieces for baking. In order to do this the rolled mass is warped by a second corrugated roller 109. This latter roller is disposed oblique to the line of travel of the apron and extends partly across the apron, to approximate center of width thereof from the side of the table upon which the shield or deflector 108 is mounted. A turret bracket 110 is secured to the table and is provided with an upright portion that terminates in a hollow embossment 111 that is horizontally bored to receive the shouldered portion of the trunnion or spindle of the roller 109. The end of the trunnion projects out of the embossment 111 and has a sheave 112 secured to it that is actuated by a belt 113 deriving its motion from a sheave on the end portion of the horizontal shaft 42 that is driven by the motor 29 at the discharge end of the apparatus. The spirally rolled dough with the helically disposed water coating layer outermost is engaged by this oblique roller 109 which rotates in a direction opposing the line of travel of the apron 11 and bodily warps or distorts the dough roll in a manner which straightens the helical outer layer so that when the dough roll leaves the outer free end of the roller 109 at the center of the conveyor apron the coiled mass will be straightened with the water coated margin outermost and extending in a substantially straight line.

Before leaving the apron the elongate roll of dough passes under a dividing or cutting device which is in the form of a central body 115 of cylindrical shape that has a spindle 116 projected beyond its ends and freely journaled in elongate vertical slots 117 of upright side plates 118 secured to the table. The cylindrical body 115 is provided with longitudinal disposed cutter blades 119 that project radially therefrom, and the ends of the body are provided with disk-shaped plates 120, the diameters of which are less than the periphery of the circle described on the cutting edges of the blades 119. This structure is adapted to be rotated by the engagement of the cutter blades 119 with the apron 11 and when the roll of dough is engaged by these blades the latter will cut the dough into the proper sizes for use in baking the cinnamon rolls.

In practice the small pieces of dough are removed at the discharge end of the apron 11, placed manually in suitable pans, and then deposited in the oven for baking. Throughout the entire operation of the apparatus it is not necessary for the attendant to handle the dough owing to the fact that all the steps performed by the apparatus are of an automatic character.

What is claimed is:

1. Apparatus of the kind described embodying a traveling conveyor adapted to move a flat dough strip in a longitudinal direction; and spaced means cooperating with said conveyor and adapted to successively operate upon the dough, the first of said means adapted to form the flat dough strip into an elongate helical roll, and the second of said means adapted to twist the helical roll of dough transverse to its length.

2. Apparatus of the kind described embodying a traveling conveyor adapted to move a flat dough strip in a longitudinal direction; and spaced means cooperating with said conveyor and adapted to successively operate upon the dough, the first of said means embodying an obliquely disposed member adapted to form the flat dough strip into an elongate helical roll, and the second of said means embodying an oppositely disposed oblique member adapted to twist the helical roll of dough transverse to its length.

3. Apparatus of the kind described embodying a traveling conveyor adapted to move a flat dough strip in a longitudinal direction; and spaced means cooperating with said conveyor and adapted to successively operate upon the dough, the first of said means embodying a member rotatable in a direction opposing the movement of the dough and adapted to helically roll the dough strip, and the second of said means adapted to transversely twist the helical roll of dough.

4. Apparatus of the kind described embodying a traveling conveyor adapted to move a flat dough strip in a longitudinal direction; and spaced means cooperating with said conveyor and adapted to successively operate upon the dough, the first of said means embodying a member rotatable in a direction opposing the movement of the dough and adapted to helically roll the dough strip, and the second of said means embodying a member rotatable in a direction opposing the movement of the helical roll and adapted to transversely twist the latter.

5. Apparatus of the kind described embodying a traveling conveyor adapted to move a flat dough strip in a longitudinal direction; and spaced means cooperating with said conveyor and adapted to successively operate upon the dough, the first of said means embodying an obliquely disposed roller rotatable in a direction opposing the movement of the dough strip whereby said roller is adapted to form the flat dough strip into an elongate helical roll, and the second of said means embodying an oppositely disposed oblique roller rotatable in opposite direction to the first-mentioned roller whereby said second roller is adapted to twist the helical roll of dough transverse to its length.

6. Apparatus of the kind described embodying a traveling conveyor adapted to move a flat dough strip in a longitudinal direction; and spaced obliquely disposed rollers cooperating with said conveyor and adapted to successively operate upon the dough, said rollers adapted for rotation opposing the movement of the dough and disposed at an angle to each other over the respective margins of the conveyor, the first of said oblique rollers adapted to coil the flat dough strip into an elongate helical roll, and the second of said oblique rollers adapted to twist the helical roll of dough transverse to its length.

7. Apparatus of the kind described embodying a traveling conveyor adapted to move a flat dough strip in a longitudinal direction; a roller adapted to engage the moving dough strip and coil the strip in a direction that is opposed to the direction of travel of said conveyor whereby the dough is delivered from said roller in an elongate helical roll; and a second roller adapted to engage and bodily twist the elongate roll of dough whereby to straighten the aforesaid spiral margin of the strip and dispose said margin substantially parallel with the body of the elongate roll of dough.

8. Apparatus of the kind described embodying a traveling conveyor adapted to move a flat dough strip in a longitudinal direction; a roller rotatable in a direction opposed to the direction of travel of said conveyor, said roller disposed obliquely over an edge of the conveyor and adapted to coil the dough strip into an elongate helical roll that is discharged from said roller adjacent a margin of the conveyor; and a second roller adapted to move the elongate roll of dough to the midportion of the conveyor.

9. Apparatus of the kind described embodying a traveling conveyor adapted to move a flat dough strip in a longitudinal direction; a roller rotatable in a direction opposed to the direction of travel of said conveyor, said roller disposed obliquely over an edge of the conveyor and adapted to coil the dough strip into an elongate helical roll that is discharged from said roller adjacent a margin of the conveyor; and a second roller rotatable in opposite direction to the first roller and disposed obliquely over the other edge of said conveyor at an angle to the first roller, whereby said second roller is adapted to move the elongate roll of dough to the midportion of the conveyor.

10. Apparatus of the kind described embodying a traveling conveyor adapted to move a flat dough strip in a longitudinal direction; a roller adapted to engage the moving dough strip and coil the strip in a direction that is opposed to the direction of travel of said conveyor whereby one of the longitudinal margins of the dough strip is disposed spirally upon the outer surface of the elongate roll of dough; and a second roller adapted to engage and bodily twist the elongate coil of dough whereby to straighten the aforesaid spiral margin of the strip and dispose said margin substantially parallel with the body of the elongate coil of dough.

11. Apparatus of the kind described embodying a traveling conveyor adapted to move a flat dough strip in a longitudinal direction; a corrugated oblique roller rotatable in a direction opposing the movement of said conveyor, said roller extending over an edge of the conveyor and adapted to coil the dough strip into an elongate helical roll that is delivered from the end of said roller adjacent a margin of the conveyor; and a second corrugated roller disposed obliquely over the opposite margin of the conveyor in the path of movement of the coiled dough, said second roller rotatable in a direction opposing the movement of the conveyor whereby said second roller is adapted to move the elongate roll of dough to the midportion of the conveyor, and during said movement to twist coil of dough transverse to its length.

12. Apparatus of the kind described embodying a traveling conveyor adapted to move a flat dough strip in a longitudinal direction; means for applying a coating to a longitudinal margin of the dough strip; and spaced means coacting with said conveyor to successively operate upon the dough strip, the first of said means adapted to coil the strip into an elongate helical roll in which the coated margin is disposed spirally around the exterior of the roll, and the second of said means adapted to twist the helical roll upon its axis whereby to dispose the coated margin in a substantially straight line longitudinally of the roll.

13. Apparatus of the kind described embodying a traveling conveyor adapted to move a flat dough strip in a longitudinal direction; means for applying a coating to a longitudinal margin of the dough strip; and spaced means coacting with said conveyor to successively operate upon the dough strip, the first of said means adapted to obliquely coil the strip into an elongate roll whereby a plurality of helical layers are provided and the coated margin is disposed outermost and spirally of the elongate roll, and the second of said means adapted to bodily twist the helical roll upon its axis whereby to dispose the coated margin in a substantially straight line longitudinally of the roll.

14. Apparatus of the kind described embodying a traveling conveyor adapted to move a flat dough strip in a longitudinal direction; means for applying a coating to a longitudinal margin of the dough strip; and spaced means coacting with said conveyor to successively operate upon the dough strip, the first of said means disposed obliquely across the dough strip and adapted to coil the strip into an elongate helical roll in which the coated margin is disposed spirally around the exterior of the roll and the second of said means disposed oblique to the conveyor in a direction opposite to said first means, said second means adapted to engage the helical roll and twist it bodily upon its axis whereby to dispose the coated margin in a substantially straight line longitudinally of the roll.

15. Apparatus of the kind described embodying means for forming a dough batch into a flat sheet; a traveling conveyor adapted to move the dough sheet in a longitudinal direction; means for applying a coating to a longitudinal margin of the dough sheet; and spaced means coacting with said conveyor to successively operate upon the dough sheet, the first of said means adapted to coil the sheet in an oblique direction towards a margin of the conveyor whereby the strip is formed into an elongate helical roll with the coated margin providing a spirally disposed outer layer, and the second of said means adapted to obliquely engage the helical roll and move it towards the central portion of said conveyor whereby to twist the helical roll upon its axis and discharge the roll with the coated margin in a substantially straight line longitudinally of the roll.

16. Apparatus of the kind described embodying means for forming a dough batch into a flat sheet; a traveling conveyor adapted to move the dough sheet in a longitudinal direction; means for applying a coating to a longitudinal margin of the dough sheet; and two rollers spaced from each other longitudinally of said conveyor and extending obliquely across opposite margins thereof with their axes intersecting each other; the first of said rollers adapted to form the sheet into an elongate helical roll with the coated margin outermost and disposed spirally of the elongate roll, and the second of said rollers adapted to twist the helical roll bodily upon its axis whereby to dispose the coated margin in a substantially straight line longitudinally of the roll.

17. Apparatus of the kind described embodying an elongate table; a conveyor traversing said table in a longitudinal direction thereon; means for delivering a flat dough strip to said conveyor; means adapted to spirally roll the dough strip and move the same in a direction oblique to the travel of the conveyor; and means adapted to change the movement of the coiled dough in an oblique direction opposite the first oblique movement.

18. Apparatus of the kind described embodying an elongate table; a conveyor traversing said table in a longitudinal direction thereon; means for delivering a flat dough strip to said conveyor; a member rotatable in a direction opposing the movement of said conveyor, said member adapted to roll the dough strip into a coil and move the coiled strip obliquely toward a margin of the conveyor; and a second member rotatable in a direction opposing the movement of the conveyor, said second member adapted to bodily roll the coiled dough in an oblique direction toward the opposite margin of said conveyor.

19. Apparatus of the kind described embodying an elongate table; a conveyor traversing said table in a longitudinal direction thereon; means for delivering a flat dough strip to said conveyor; an obliquely disposed roller extending over said conveyor and rotatable in a direction opposing the travel of said conveyor, said roller adapted to roll the dough strip into a coil having greater length than thickness and with a longitudinal margin of the dough strip disposed helically on the outside of the coil; and a second obliquely disposed roller extending over said conveyor and rotatable in a direction opposing the travel of said conveyor, said second roller adapted to bodily twist the dough coil in a direction whereby to straighten the said helically disposed longitudinal margin of the dough strip on the coil.

MARTIN E. FONKEN.